United States Patent [19]
Kumagai

[11] Patent Number: 5,007,098
[45] Date of Patent: Apr. 9, 1991

[54] VECTORIZING METHOD
[75] Inventor: Ryohei Kumagai, Tokyo, Japan
[73] Assignee: Ezel, Inc., Tokyo, Japan
[21] Appl. No.: 292,309
[22] Filed: Dec. 30, 1988
[51] Int. Cl.⁵ .................................................. G06K 9/48
[52] U.S. Cl. ........................................ 382/21; 382/22; 382/25; 382/56
[58] Field of Search ................. 382/21, 22, 25, 60, 382/56

[56] References Cited
U.S. PATENT DOCUMENTS

| | | | |
|---|---|---|---|
| 3,942,169 | 3/1976 | Fujimoto et al. | 382/21 |
| 4,524,454 | 6/1985 | Ejiri | 382/21 |
| 4,566,124 | 1/1986 | Yamamoto et al. | 382/21 |
| 4,628,532 | 12/1986 | Stone et al. | 382/21 |
| 4,630,306 | 12/1986 | West et al. | 382/21 |
| 4,653,107 | 3/1987 | Shojima et al. | 382/22 |
| 4,718,103 | 1/1988 | Shojima et al. | 382/21 |

Primary Examiner—David K. Moore
Assistant Examiner—Joseph Mancuso
Attorney, Agent, or Firm—Cushman, Darby & Cushman

[57] ABSTRACT

A vectorizing method generates an original train of codes for specifying boundary pixels. A revised train of codes is generated solely from the original codes. The revised train may includes points omitted from the original train. Vector points defining boundaries are selected from the revised train of codes.

39 Claims, 17 Drawing Sheets

|   | 5 | 4 | 4 | 4 |   |
|---|---|---|---|---|---|
| 6 |   |   |   |   | 3 |
| 6 |   |   |   |   | 2 |
| 6 |   |   |   |   | 2 |
| 7 |   |   |   |   | 2 |
|   | 0 | 0 | 0 | 1 |   |

F I G. 17(b)

| 6 | 4 | 4 | 4 | 4 | 4 |
|---|---|---|---|---|---|
| 6 |   |   |   |   | 2 |
| 6 |   |   |   |   | 2 |
| 6 |   |   |   |   | 2 |
| 6 |   |   |   |   | 2 |
| 0 | 0 | 0 | 0 | 0 | 2 |

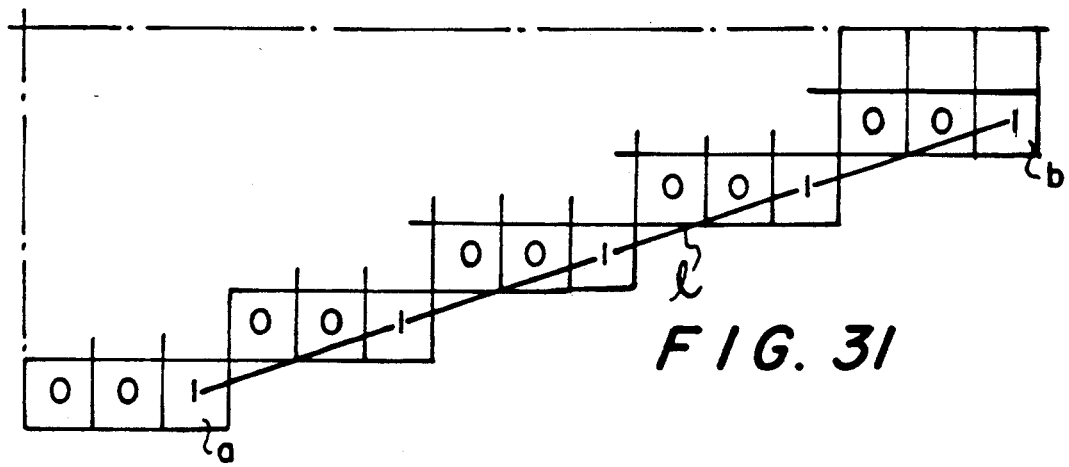
FIG. 31
FIG. 32
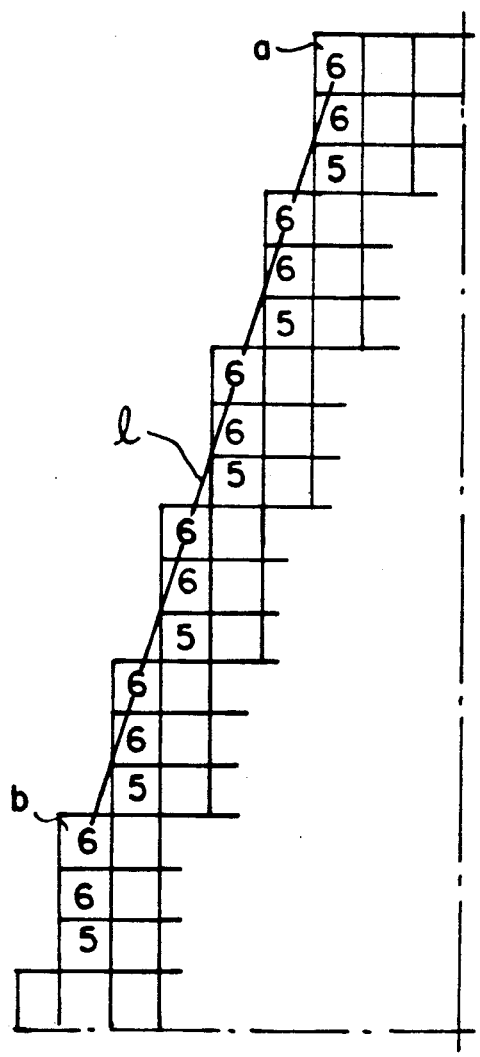
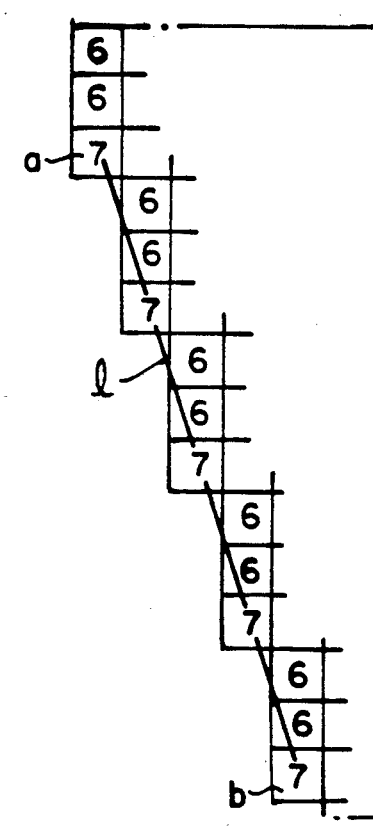
FIG. 33

VECTORIZING METHOD

BACKGROUND OF THE INVENTION

There are two types of data for storing or registering a configuration, that is, raster type and vector type. The vector type data, particularly the peripheral vector data is useful because it is smaller in volume than the raster data, as well as easily rotatable and changeable in size.

Vector data is defined by a train of a part of boundary pixels of a configuration, so the quality of the reappeared configuration depends on selection of boundary pixels.

In the case of character vectorizing, such as Chinese character's vectorizing, the reappearance quality is very important because the product's value mainly depends on the reappearance quality.

As far as the inventor knows, conventional vectorizing method comprises angular calculations between pairs of boundary pixels of a configuration. Since the angular calculation is floating point calculation, it takes long time to select boundary pixels.

Furthermore, it is difficult to find and define a corner point on a right angle concavity.

SUMMARY OF THE INVENTION

According to the vectorizing method of the present invention. Freeman's chain code or any other code equivalent thereto is generated because the code reflects the polygonal curve and other characteristics of peripheral.

Then from the train of the codes, pixels on the border or near the border are selected as vector points for defining a configuration.

As shown in FIG. 1, Freeman's chain code consists of the number from "0" to "7"; "0" means rightward, "1" upper rightward, "2" upward, "3" upper leftward, "4" leftward, "5" down leftward, "6" downward and "7" down rightward. Each chain code indicates the direction from one boundary pixel toward the next boundary pixel when boundary pixels are traced in one rotational direction, successively.

By selecting vector points according to the train of the chain code or any other equivalent code, it is possible to generate high quality vector data in much shorter time than the conventional method. Therefore, it is the object of the present invention to provide a vectorizing method for generating vector data in short time, from which data a high quality configuration can be reappeared.

BRIEF DESCRIPTION OF THE PREFERRED EMBODIMENT

Figure 7A:
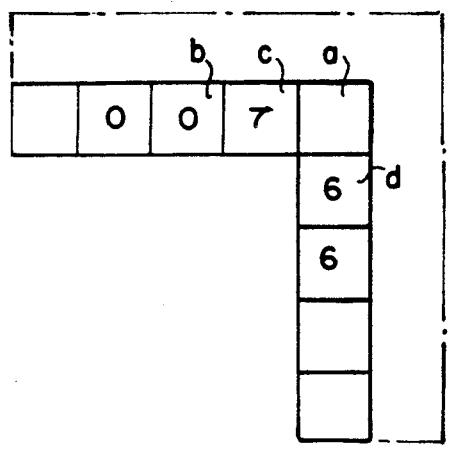
Figure 7B:
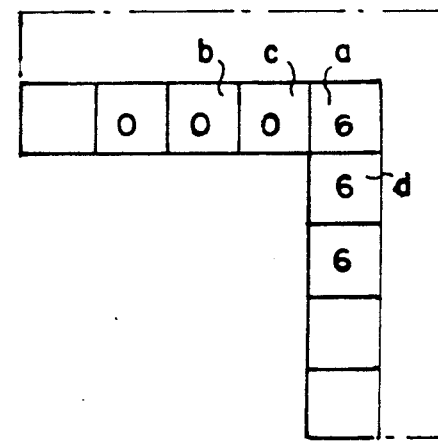
Figure 8A:
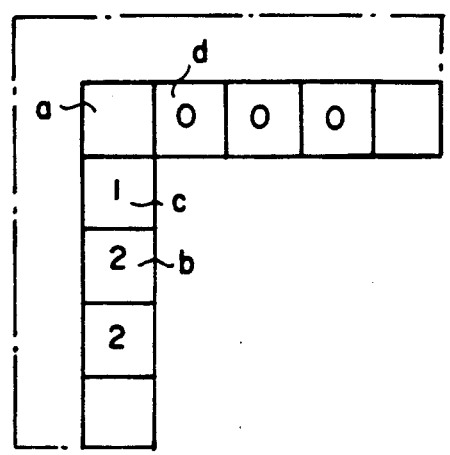
Figure 8B:
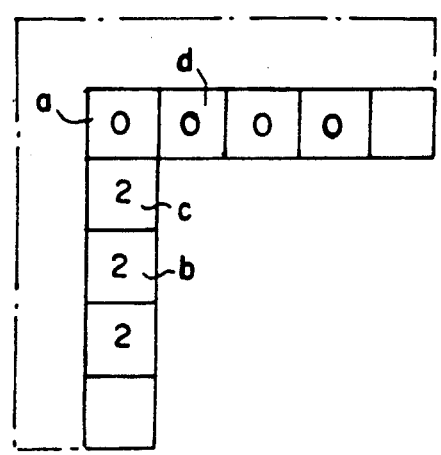
Figure 9A:
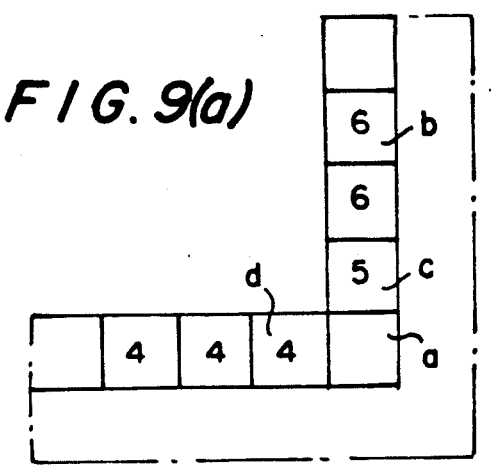
Figure 9B:
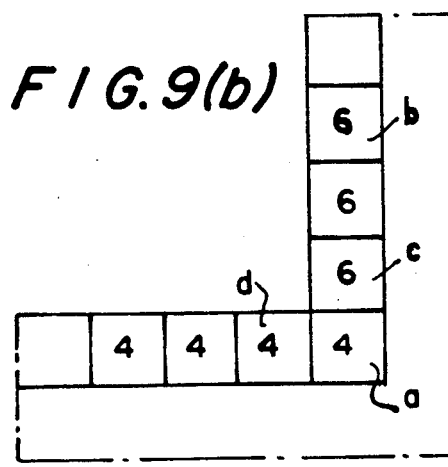
Figure 10A:
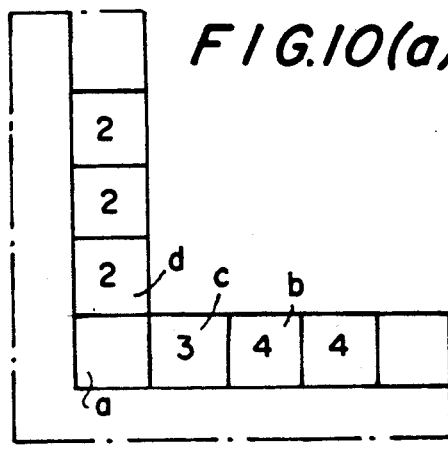
Figure 10B:
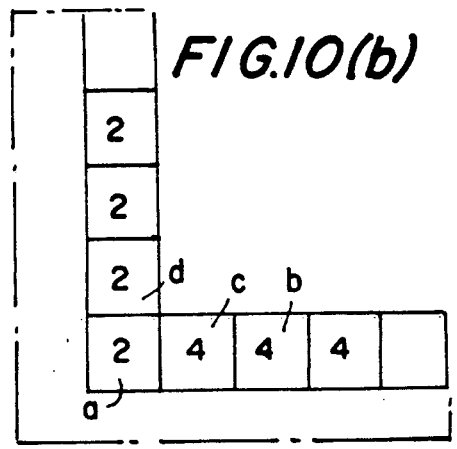
Figure 11:
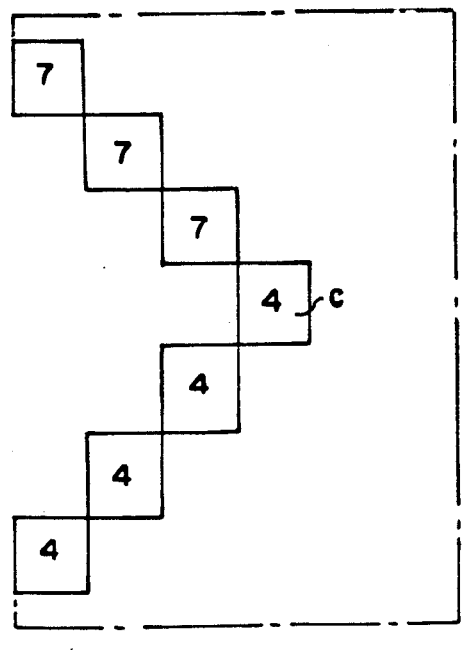
Figure 13A:
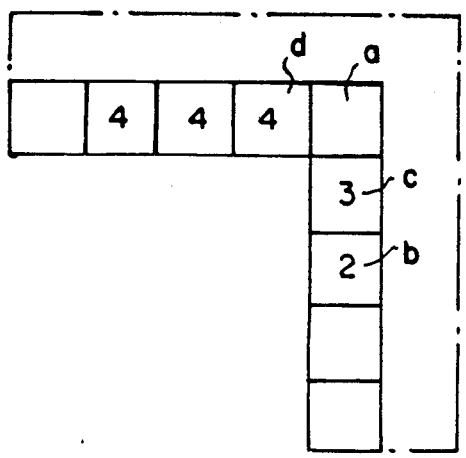
Figure 13B:
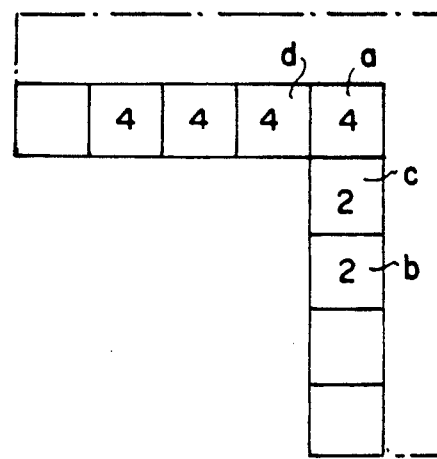
Figure 14A:
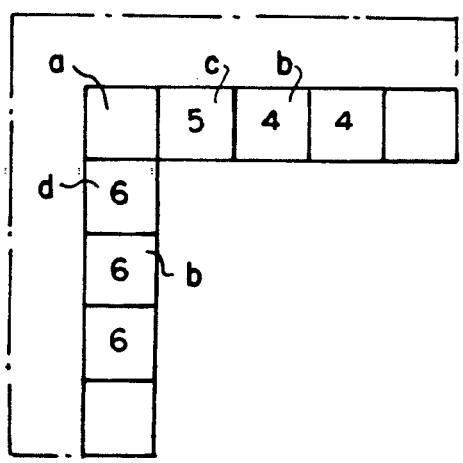
Figure 14B:
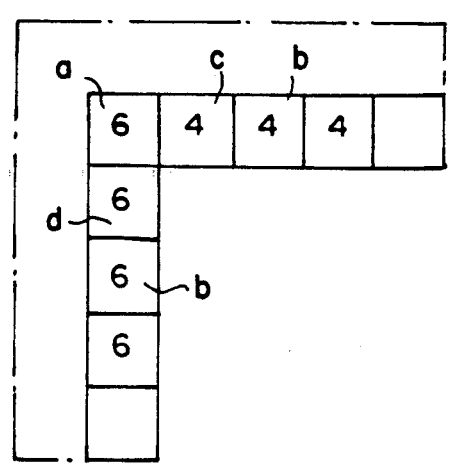
Figure 15A:
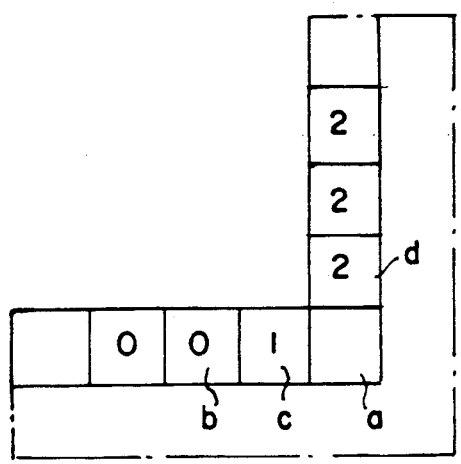
Figure 15B:
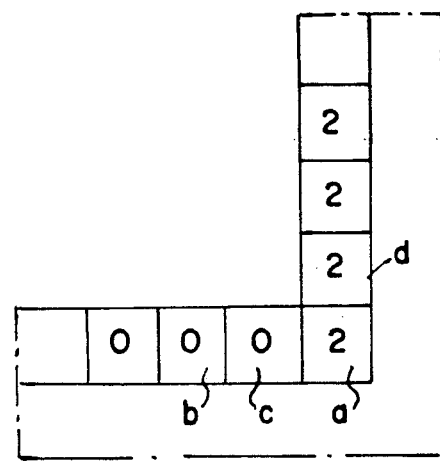
Figure 16A:
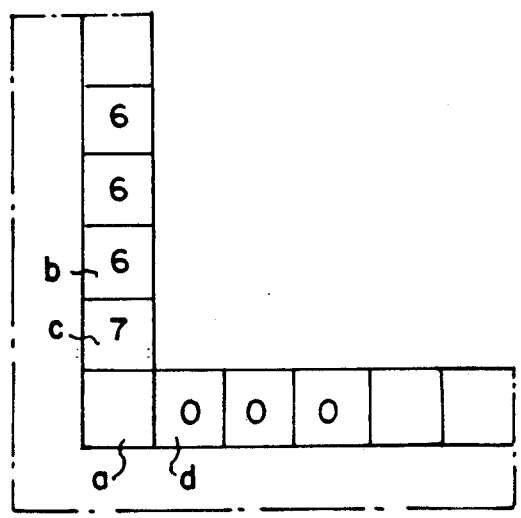
Figure 16B:
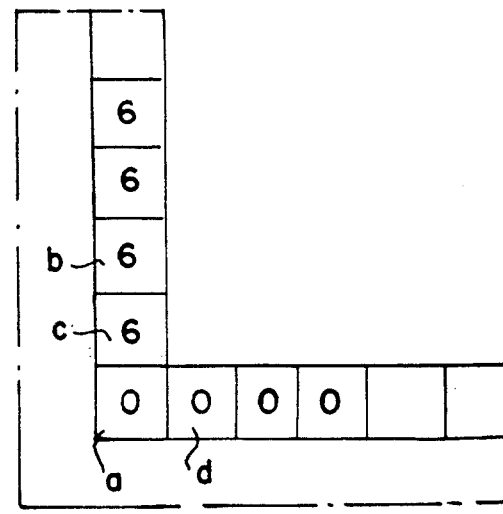
Figure 18:
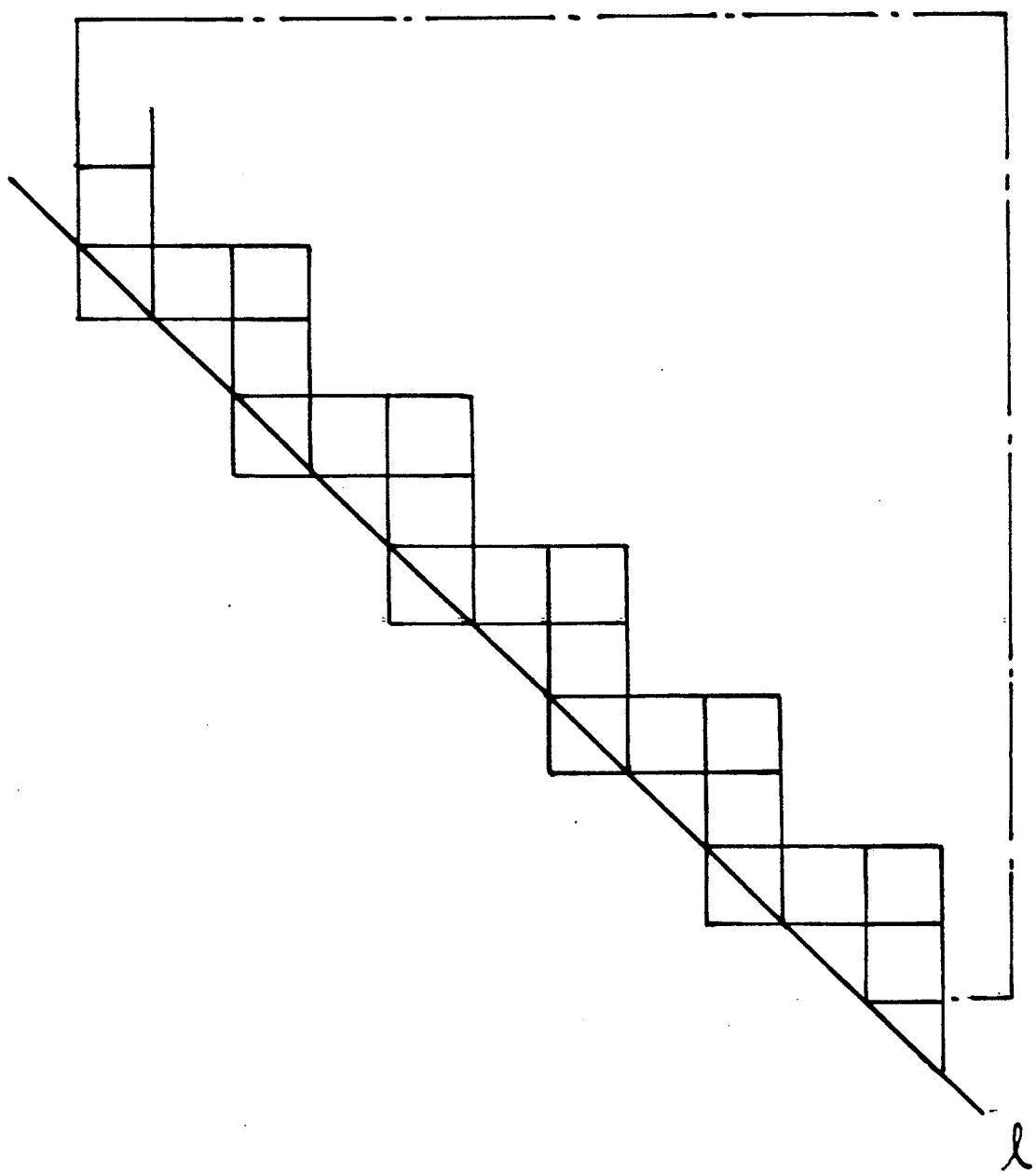
Figure 19:
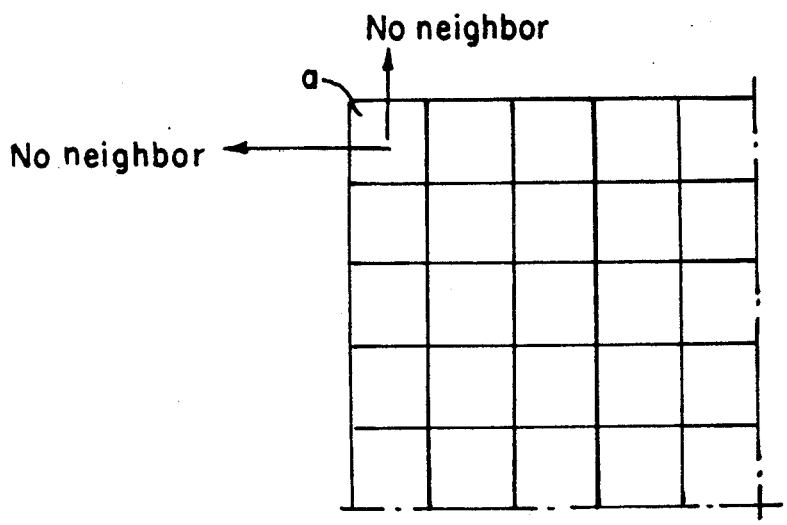
Figure 20:
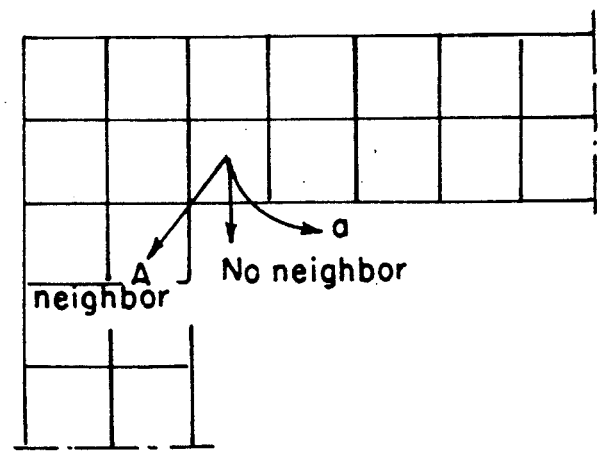
Figure 21:
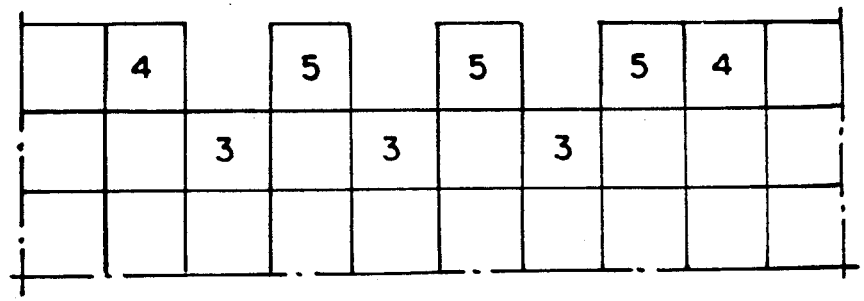
Figure 22:
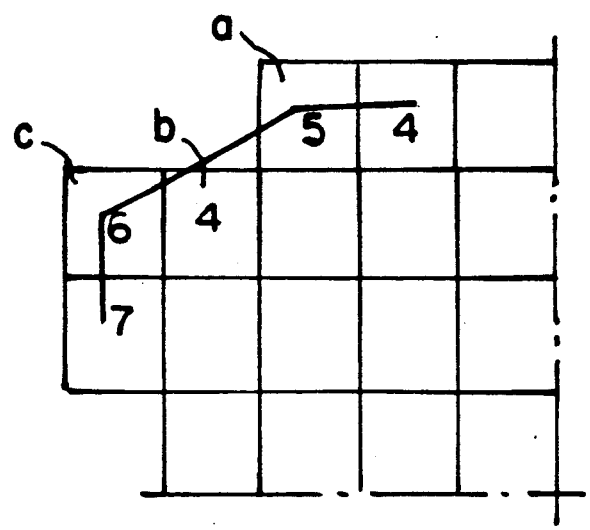
Figure 23:
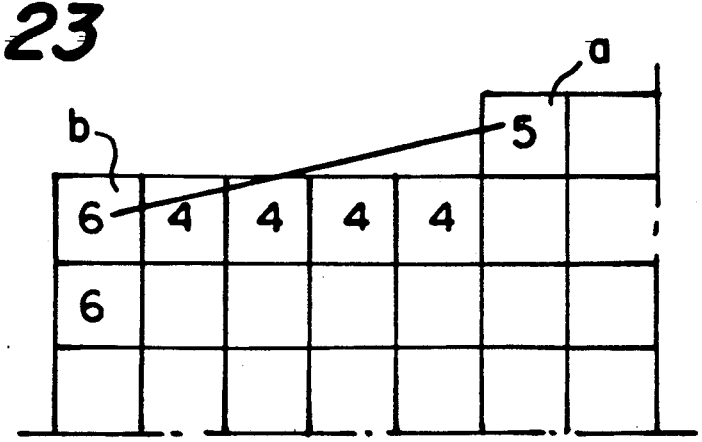
Figure 24:
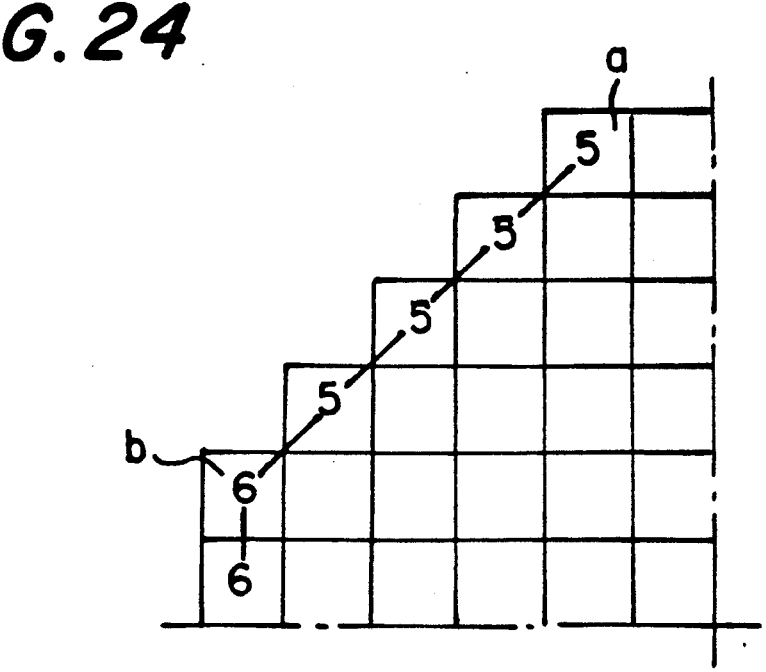
Figure 25:
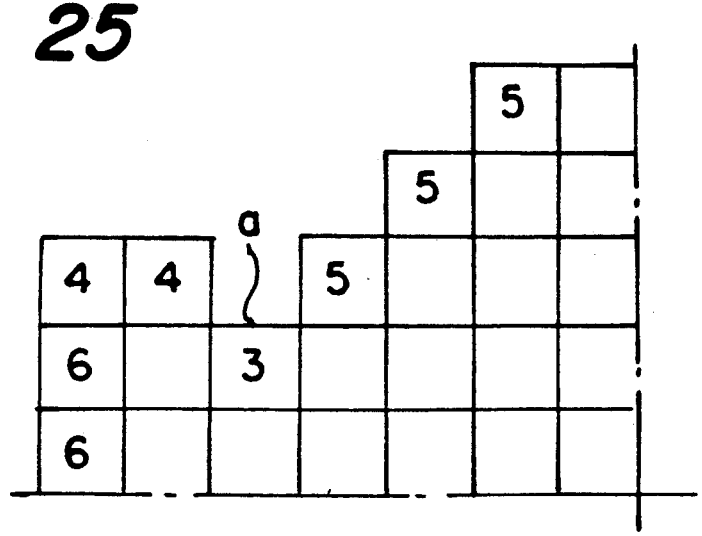
Figure 26:
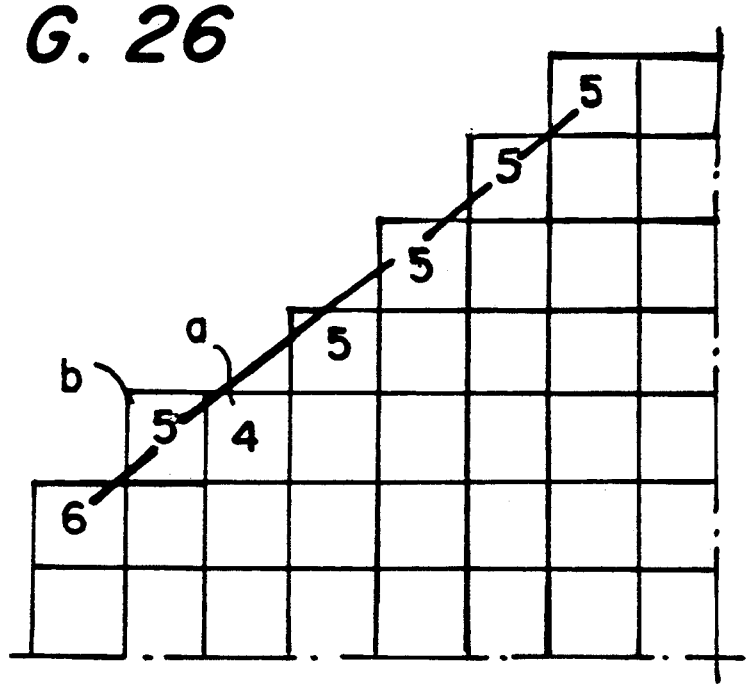
Figure 27:
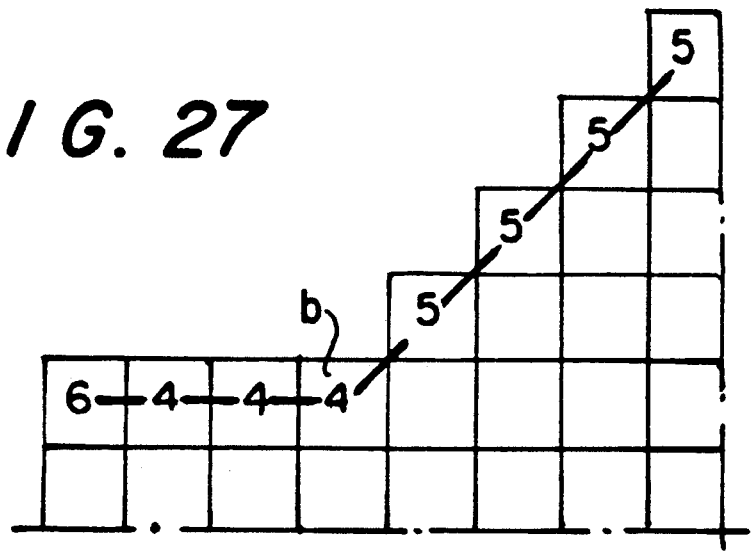

FIGS. 7 (a) and (b) show a chain code diagram of two steps of the first embodiment of the present invention with respect to a right angle concavity;

FIGS. 8 (a) and (b) show a chain code diagram generated by the first embodiment with respect to another right angle concavity;

FIGS. 9 (a) and (b) show a chain code diagram generated by the first embodiment with respect to further another right angle concavity;

FIGS. 10 (a) and (b) show a chain code diagram generated by the first embodiment with respect to further another right angle concavity;

FIG. 11 shows an inclined right angle concavity;

Figures 12A, 12B:
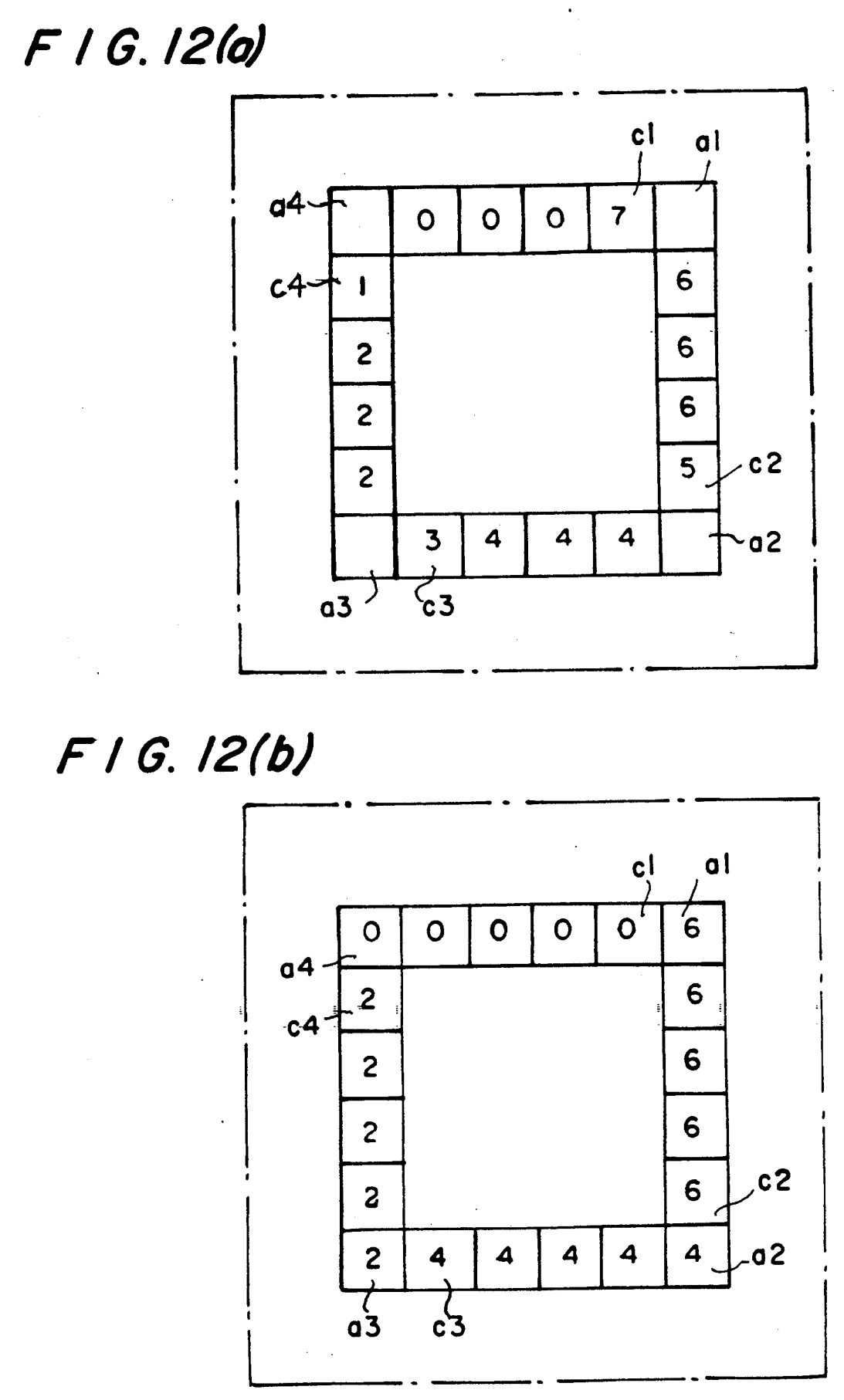

FIGS. 12 (a) and (b) show a chain code diagram generated by the first embodiment with respect to inner boundary pixels;

FIGS. 13 (a) and (b) show a chain code diagram of two steps of the second embodiment of the present invention with respect to a right angle concavity;

FIGS. 14 (a) and (b) show a chain code diagram generated by the second embodiment with respect to another right angle concavity;

FIGS. 15 (a) and (b) show a chain code diagram generated by the second embodiment with respect to further another right angle concavity;

FIGS. 16 (a) and (b) show a chain code diagram generated by the second embodiment with respect to further another right angle concavity;

FIGS. 17 (a) and (b) show a chain code diagram generated by the second embodiment with respect to inner boundary pixels;

FIG. 18 shows a stepwise boundary with small steps;

FIG. 19 shows the start point of chain code on the outer boundary;

FIG. 20 shows the start point of chain code on the inner boundary;

FIG. 21 shows a boundary having a chain code train with chain codes frequently changed;

FIG. 22 shows a boundary pixel followed by a pixel with a chain code less by 1 than the former;

FIG. 23 shows a liner boundary following to a one pixel step;

FIG. 24 shows a boundary consisting of continuous two liner boundary;

FIG. 25 shows a one pixel concavity;

FIG. 26 shows a short linear boundary following to a rather long liner boundary;

FIG. 27 shows a rather long linear boundary following to a rather long liner boundary; and FIGS. 28 to 35 show stepwise boundaries.

DETAILED DESCRIPTION OF THE PREFERRED EMBODIMENT

Hereafter, a preferred embodiment of the present invention is described in detail.

Figure 1:
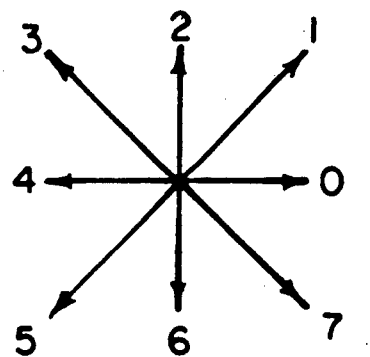
FIG. 1 shows Freeman's chain code.
Figure 2:
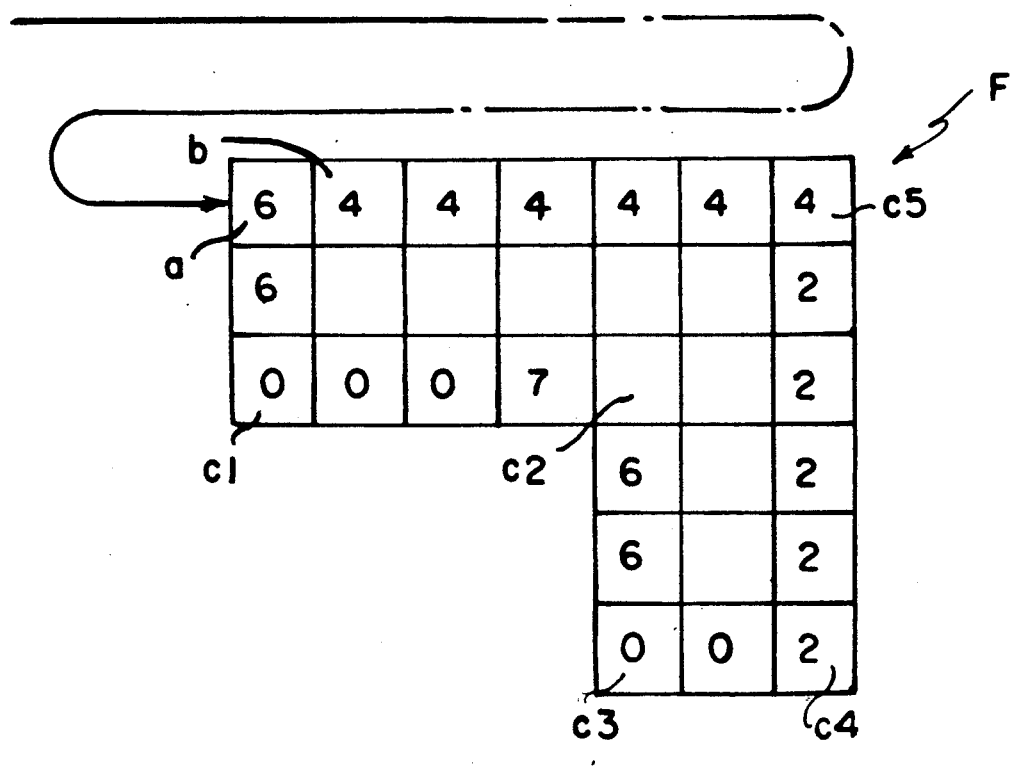
FIG. 2 shows a chain code diagram of a configuration, wherein chain codes are given to the boundary pixels according to the anticlockwise order.

In FIG. 2, there is shown a configuration F. In order to give chain code to this configuration, the start point is to be found, first. On scanning to image along the ordinal scan line, the upper left pixel a is first found in the configuration F.

Chain code is generated anticlockwisely from the start point along the boundary. Each chain code indicates the direction to the following pixel from the current pixel. The current pixel means the pixel to which chain code is to be given at that time.

FIG. 2 is a chain codes diagram indicating chain code on each boundary pixel when the boundary is traced in anticlockwise direction. In FIG. 2, the last pixel b adjacent to the start pixel a is given the chain code indicating the direction toward the pixel a.

On the other hand, as to the outer boundary, it is sometimes unnecessary to give the chain code to the last pixel.

Figure 3:
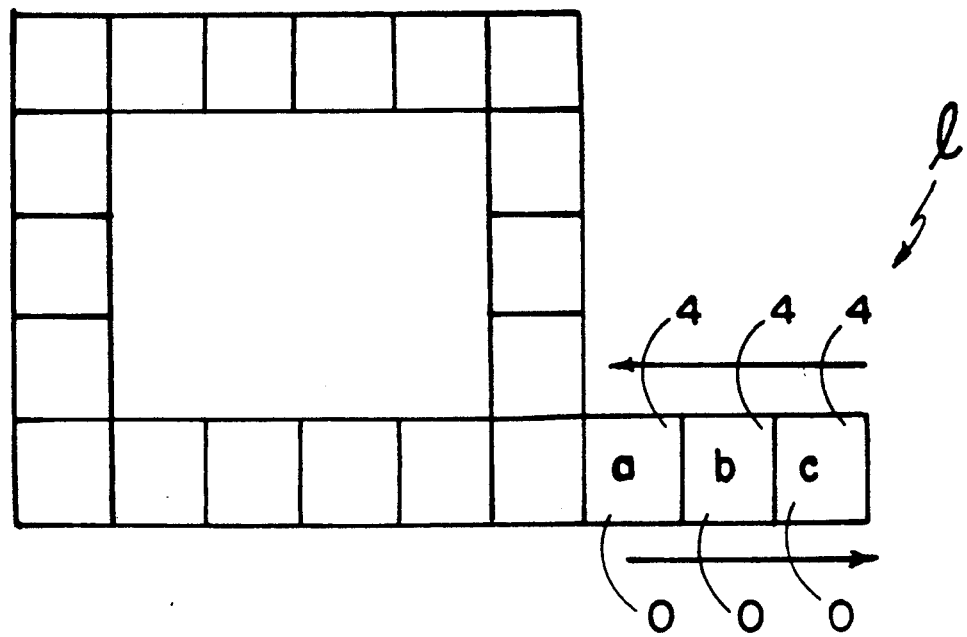
FIG. 3 shows a chain code diagram, wherein one pixel is given two different chain codes from each other.

In FIG. 3, there is shown a line 1 with a width of one pixel. In order to give chain code to pixels a, b, and c on the line 1, the line is traced toward the free end first, then is traced backwardly from the free end. Therefore, one pixel is given two different chain codes. This is an example that one chain code does not necessarily correspond to one chain code.

Chain code train in FIG. 2 is "660007660022222244444", which indicates a vertical downward line by "66", a horizontal rightward line by "00", a vertical upward line by "22" and horizontal leftward line by "44".

Figure 4:
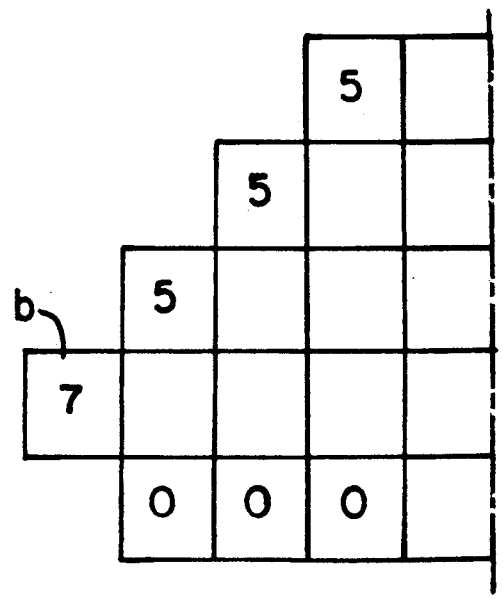
FIG. 4 shows a convex portion of a configuration.

When the configuration of FIG. 2 is vectorized, the start pixel a, the pixel $c_1$, on the right angle convex corner beneath the pixel a, the pixel $c_2$ on the right angle concave corner rightward from the pixel $c_1$, the pixel $c_3$ on the right angle convex corner beneath the pixel $c_2$, the pixel $c_4$ on the right angle convex corner rightward from the pixel $c_3$ and the pixel $c_5$ on the right angle convex corner above the pixel $c_4$ should be extracted as vector points from the boundary pixels above. While the pixel on the right angle convex corner follows at least two pixels with the same chain code less by "2" than the chain code of the former. In this calculation, "0" is deemed to be the result of the addition of "6" and "2". It will be understood from the above that the chain code reflects the characteristics of boundary of a configuration. A right angle convex corner consisting of two inclined lines in FIG. 4 has a corner point b which follows at least two pixels with the same chain code less by "2" than the chain code of the former, similarly to the above.

However the corner point $c_2$ on the right angle concave corner should be extracted as a vector point, the corner has no chain code because it is not a boundary pixel. This is one difficulty in vectorizing. The solution of this difficulty according to the present invention is described later.

Chain code is ordinarily generated with tracing the boundary in the anticlockwise direction with respect to outer boundary. It may be possible to trace the boundary in clockwise direction. With respect to the inner boundary, the tracing direction should be opposite to that of outer boundary, in order to define whether the boundary outer or inner.

Hereafter, a description is made concerning the chain code anticlockwise for outer boundary and clockwise for inner boundary.

When a pixel has a chain code of k, the chain code k' of the following pixel is as follows;
(a) k is even number
  k'≠(k−2) and (k−3)
(b) k is odd number
  k'≠(k−3)
  where, k' is calculated under the modules of "7", therefore "0"−"2"="6".

In FIG. k' is never becomes "1" and "2" when k=4. And k' never becomes "2" when k=5. Therefore, chain code of one pixel limits the chain code of the following pixel.

As mentioned above, the pixel of the chain code is a pixel on the right angle convex corner when k'=(k+2).

It is of course selectable if all the points on the right angle convex corner are extracted as vector points or not. For example, only a corner point is extracted when the corner consists of two lines, both of which are longer than a predetermined length, such as more than 3 pixels. In this case, the corner "abc" and "def" are not defined as a right angle corner, so the pixels a, c, d and f are not extracted as vector points, while only the pixels b and e are extracted. Then the configuration is reappeared as a configuration with rather dull or smooth boundary, as shown by the line 1 in FIG. 5.

Figure 5:
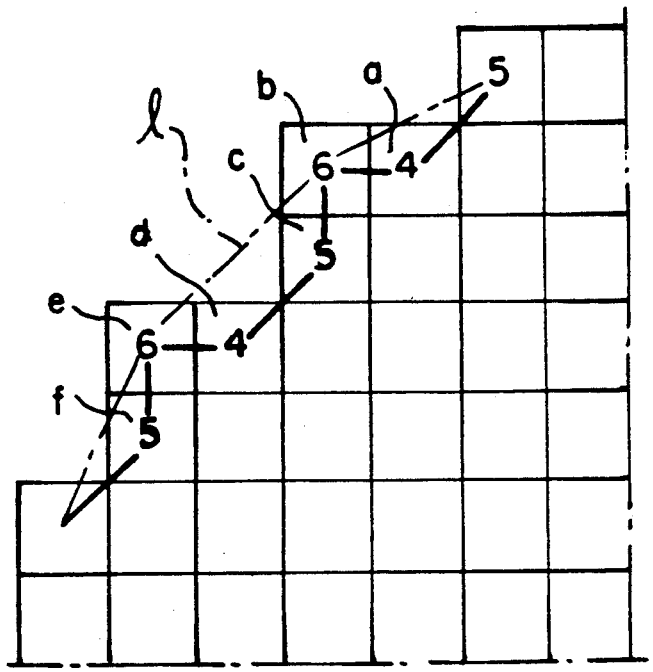
FIG. 5 shows a chain code diagram of a right angle concavity.
Figure 6:
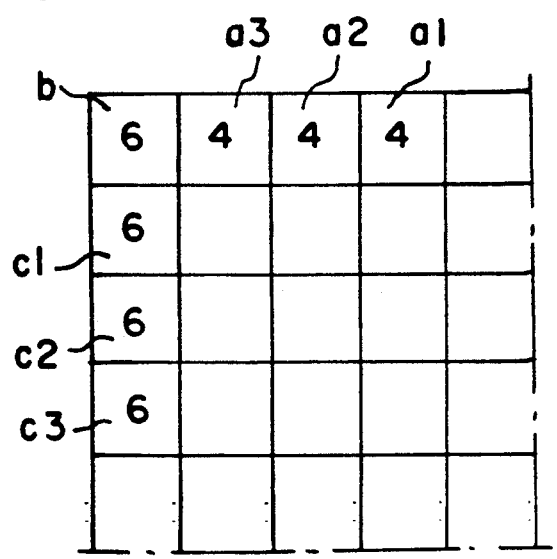
FIG. 6 shows a chain code diagram of a right angle convexity.

When all pixels are to be extracted, the pixels a to f become to be vector points, in FIG. 5.

In the processing above, the corner point on the right angle concave corner is not yet processed.

Hereafter, a process for processing the right angle concave corner is to be described.

The right angle concave corner always consists of one vertical line and one horizontal line, as shown in FIGS. 7 (a), 8 (a), 9 (a) and 10 (a).

FIG. 7 (a) shows a corner opens downwardly as well as leftwardly. The chain code train advances " ... 007" on the horizontal line toward the corner point a, then changes "66 ... " on the vertical line. In the chain code train, the last two chain codes on the horizontal line together with the first chain code on the vertical line define the right angle corner. In FIG. 7 (a), the chain codes defining right angle corner are "076". It means that there exists a left-and downwardly opening right angle corner when the chain codes "076" are included in the chain code train.

FIG. 7 (b) shows a chain code diagram in which the chain code train in FIG. 7 (a) is changed according to the present invention. In FIG. 7 (b), the last chain code on the horizontal line is changed from "7" to "0" and a new chain code "6" is appended after the changed chain code. Therefore, the chain code train "076" is modified to be "0066". By this modification, the last chain code c on the horizontal line indicates the corner point a, and the chain code on the corner point indicates the first pixel d on the vertical line.

FIG. 8 (a) shows a right-and downwardly opening right angle corner. The chain code train on the vertical line advances " ... 221" toward the corner point a. After the corner point a, the chain code train advances "00 ... ". In this case, the right angle corner is defined by the last two chain codes b and c on the vertical line as well as the first chain code d on the horizontal line. This chain code train is "210". It means that there exists a down-and rightwardly opening right angle corner when the chain code train includes the chain codes "210".

FIG. 8 (b) shows a chain code diagram in which the chain code train in FIG. 8 (a) is changed according to the present invention. In FIG. 8 (b), the last chain code c on the horizontal line is changed from "1" to "2" and a new chain code "0" is appended after the changed chain code. Therefore, the chain code train "210" is modified to be "2200". By this modification, the last chain code c on the horizontal line indicates the corner point a, and the chain code on the corner point a indicates the first pixel d on the horizontal line.

FIG. 9 (a) shows a up-and lefwardly opening right angle corner. The chain code train on the vertical line advances " ... 665" toward the corner point a. After the corner point a, the chain code train advances "44 ... " on the horizontal line. This right angle corner is defined by the last two chain codes b and c on the horizontal line as well as the first chain code d on the vertical line. This chain code train is "654". It means that there exists a left-and upwardly opening right angle corner when the chain code train includes the chain codes "654".

FIG. 9 (b) shows a chain code diagram in which the chain code train in FIG. 9 (a) is changed according to the present invention. In FIG. 9 (b), the last chain code c on the vertical line is changed from "5" to "6" and a new chain code "4" is appended after the changed chain code. Therefore, the chain code train "654" is modified to be "6644". By this modification, the last chain code c on the horizontal line indicates the corner point a, and the chain code on the corner point a point a indicates the first pixel d on the vertical line.

FIG. 10 (a) shows a right-and upwardly opening right angle corner. The chain code train on the vertical line advances " . . . 443" toward the corner point a. After the corner point a, the chain code train advances "22 . . . " on the horizontal line. This right angle corner is defined by the last two chain codes b and c on the horizontal line as well as the first chain code d on the vertical line. This chain code train is "432". It means that there exists a right-and upwardly opening right angle corner when the chain code train includes the chain codes "432".

By the modification similar to the modification in FIGS. 7 (b), 8 (b) and 9 (b), a new chain code is given to the corner point, and the chain code just before the corner point is changes so as to indicate the corner point.

FIG. 10 (b) shows the modification. The last two chain code c on the horizontal line is changed from "3" to "4" and a new chain code "2" is given to the corner point. The chain code train "432" is modified to be "4422". By this modification, the last chain code c on the horizontal line indicates the corner point a and the chain code on the corner point indicates the first pixel d on the vertical line.

The processing above is processing for outer boundary. The processing for inner boundary is described hereinafter.

FIG. 12 (a) shows a chain code diagram of an inner boundary. The chain code train is "0007666544432221". When the last chain code of the train is deemed to be continued to the first thereof, the right angle corners are defined by the chain codes "076", "654", or "432" or "210", similarly to the outer right angle corner.

The chain code trains are processed or modified similarly to the outer boundary, that is, "076" is changed to "0066", "654" is changed to "6644", "432" is changed to "4422" and "210" is changed to "2200", as shown in FIG. 8. In other words, the corner points a1, a2, a3 and a4 are given new chain codes, and the chain codes to which the corner points follow are changed from "7" to "0", "5" to "6", "3" to "4" or "1" to "2".

By the processing above, the outer as well as inner boundary is reappeared with respect to the right angle corner.

In the processing above, the right angle corner is detected by successive three chain codes. However, in some cases, such as stepwise boundary consisting of fine steps in FIG. 18, it may be better to reapper the boundary as a straight line. Therefore, it is possible to make a judgement of right angle corner when there exists a straight line longer than a predetermined length continuous to each end of the 3 chain codes mentioned above. For example, a chain code train "00766" is deemed to define a right angle corner so as to be changed to "000666".

Hereafter, the second embodiment of clockwise chain code train is described.

FIG. 14 (a) shows a chain code diagram in which clockwise chain code train is given to the configuration same as that in FIG. 8. In FIG. 14 (a), the right angle corner is defined by the chain codes "456". FIG. 14 (b) shows a modification of chain code train, from "456" to "4466". By the modification, the right angle corner can be clearly reappeared.

FIG. 15 (a) shows a chain code diagram in which clockwise chain code train is given to the configuration same as that in FIG. 9. In FIG. 15 (a), the right angle corner is defined by the chain codes "012". FIG. 15 (b) shows a modification of chain code train, from "012" to "0022". By the modification, the right angle corner can be clearly reappeared.

FIG. 16 (a) shows a chain code diagram in which clockwise chain code train is given to the configuration same as that in FIG. 10. In FIG. 16 (a), the right angle corner is defined by the chain codes "234". FIG. 16 (b) shows a modification of chain code train, from "234" to "2244". By the modification, the right angle corner can be clearly reappeared.

FIG. 17 shows a processing for a inner boundary or a hole. The inner boundary is given the chain code train in opposite direction to that of outer boundary. As shown in FIG. 17 (a), the chain code train is "5666700012223444". The last chain code of the train is deemed to be continuous to the first thereof, similarly to the first embodiment. The chain code trains defining the right angle corner are same as that of outer boundary. The chain code trains are "234", "456", "012" and "670", which are to be modified to "2244", "4466", "0022" and "6600", respectively. By this modification, the right angle corners are clearly reappeared.

Similarly to the first embodiment, it is possible to make judgment of right angle corner when there exist straight lines longer than a predetermined length continuous to each end of a chain code train.

An example of chain code generating process is now described. In order to generate chain code, the start point has to be found first. The start point can be defined by the neighbor pixels in the relationship with the scan line direction.

When the scan line is ordinal, that is, each scan line is generated after upper scan line and advances rightwardly, the boundary pixel which does not have upper and left neighbors can be defined as the start point of the chain code on the outer boundary, as shown in FIG. 19. The boundary pixel a with lower left neighbor but without lower neighbor can be defined as the start point of the chain code on the inner boundary, as shown in FIG. 20.

As mentioned above, since a chain code limits the following chain code, only the area should be searched clockwisely or anticlockwisely where the following chain code can exist. When the chain code train is anticlockwise on the outer boundary, the searching direction should be also anticlockwise, and vice versa.

The chain code train on the inner boundary can be also generated according to the algorithms for outer boundary.

When a chain code is a even number k of a pixel on the inner boundary, the following chain code can be determined by searching boundary pixel anticlockwisely from the direction of the chain code (k−1). The direction in which a boundary pixel is first found is the direction corresponding to the chain code of the pixel.

When k is odd number, the search begins from the direction of the chain code (k−2).

This algorithm is efficient because the total chain code train is generated by tracing the boundary pixels once. The algorithm is effective for filling hole because the outer boundary and inner boundary are distinguished from each other.

Hereafter, an algorithm is described for extracting vector points from a chain code train, not limited for reappearing right angle corner.

In FIG. 21, there exist different chain codes one after another and the configuration has complicated boundary with convexities and concavities. In order to express such a configuration precisely, the total boundary pixels are extracted as vector points.

While in the case of FIG. 22, it may be better to omit the small concavity even when there exist different chain codes one after another. In FIG. 22, the chain code "5" is followed by a chain code less by "1", that is, "4" on the pixels a and b around the concavity. The chain code train "k, (k−1)" defines a straight line longer than one pixel after a one pixel step. By omitting the pixel of the chain code "k−1" from the vector points and by extracting the next pixel to the pixel of "k−1", the reappeared configuration has higher quality than that of the precisely reappeared configuration. The data efficiency is also improved. This rule include a rule for vectorizing right angle concavity and is summarized as follows;

In the chain code train "k, k'", the pixel of chain code "k'" can be extracted as a vector point. When the relationship between k and k' is followings:

$$k \neq k' \text{ and } k' \neq (k-1)$$

When k'=(k−1) and one or more pixel of the chain code "k−1" follows the first pixel of "k−1", as shown in FIG. 23, it is better to omit all the pixel of "k−1" from vector points. Then the first pixel b of a chain code other than "k−1" after the chain code train of "k−1, k−1, ..." should be extracted as a vector point.

In other words, the pixel of the chain code "k'" in the following chain code train should be extracted as a vector point.

$$k, (k-1), (k-1), \ldots, (k-1), k'$$

where, k'≠k−1.

It is possible that the start point a is omitted according to the chain code train to which the start point follows. However, the connecting point b should be extracted as a vector point.

In other words, when a constant chain code train is followed by a chain code train with constant chain codes, the pixel of the first chain code of the second line should be extracted as a vector point, as shown by the underline in the following chain code train.

$$k, k, \ldots k, \underline{k'} \, k', \ldots, k'$$

where, k'≠k.

A chain code train of constant chain codes defines a straight line in geometrical meaning. When two straight lines with different inclination from each other are connected at the end points with each other, as shown in FIG. 24, both straight lines should be reappeared. In FIG. 24, a line of chain code train "5, 5, ..." is followed by a line of chain code train "6, 6, ...". The start point of the line of chain code "5" is a and the end point thereof is b.

FIG. 25 shows a one pixel concavity after a straight line of chain code "5". The bottom point of the concavity can be extracted, by extracting a pixel with a chain code different from and after the constant chain codes defining a straight line.

FIG. 26 shows a two pixel straight line after a straight line with a chain codes less by "1" than that of the first straight line. The chain code train may be explained as follows;

$$k, k, \ldots, k, k-1, k'$$

where, k'≠k−1.

In this case, the pixel a of the chain code "k−1" should be omitted from vector points. Nevertheless, the next pixel b of the chain code k' should be extracted as a vector point, as is mentioned concerning FIGS. 22 and 23.

FIG. 27 shows a chain code diagram of a boundary consisting of two straight lines. The first line has chain codes of "5" and the second line has chain codes "4". The start point b of the second line should be extracted as a vector point. In other words, the pixel corresponding to the underlined chain code should be extracted in the following chain code train.

$$k, k, \ldots, k, \underline{k-1}, \ldots, k-1$$

The rules above may be summarized as follows;
(i) When k1, k2 and k3 are different chain codes from one another in the chain code train "k1, k2, k3",
if k2≠k1−1, k2 should be extracted as a vector point, and else if k2=k−1, k3 should be extracted as a vector point.
(ii) When k1≠k2, k2≠k3 and k3≠k1 in the chain code train "k1, k1, ..., k1, k2, k3",
if k2≠k1−1, k2 should be extracted as a vector point, and else if k2=k1−1, k3 should be extracted as a vector point.
(iii) When k1≠k2, k2≠k3 and k3≠k1 in the chain code train "k1, k2, k2, ..., k2, k3",
if k2≠k1−1, k2 should be extracted as a vector point, and else if k2=k1−1, k3 should be extracted as a vector point.
(iv) when k1≠k2, k2≠k3 and k3≠k1 in the chain code train "k1, k1, ..., k1, k2, k2, ..., k2, k3", k2 should be extracted as a vector point.

Figure 28:
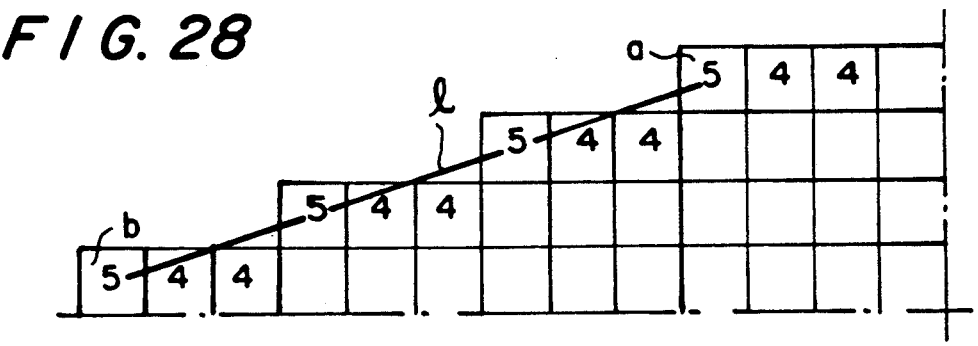
Figure 29:
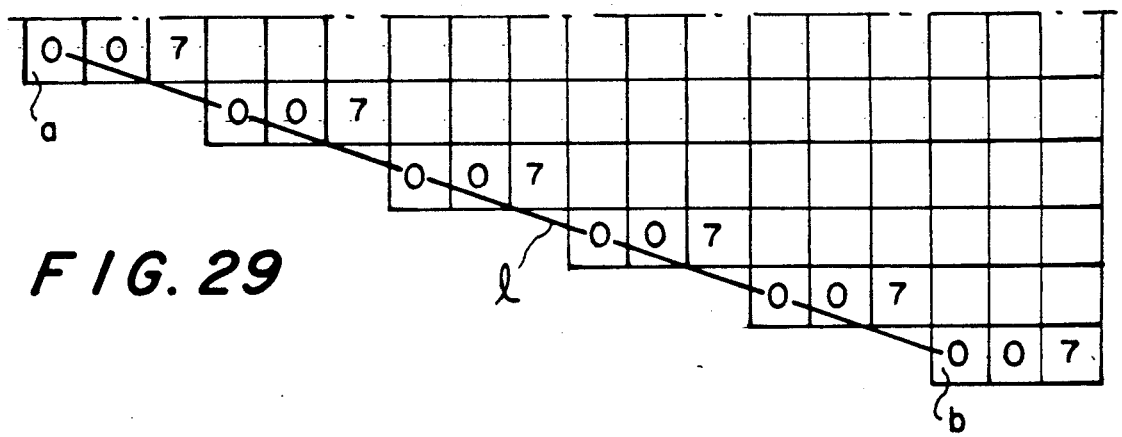

The next rule is further applicable for vectorizing in order to minimize the vector data.
(v) As shown in FIG. 28, there exit the chain code trains "445" repeatedly. These chain code trains define steps of constant period. The configuration may be approximated as one straight line. For this approximation, the following rule is to be applied. When chain code trains, consisting of combination of chain codes "k" and "k−1" or a chain code train consisting of combination of chain codes "k" and "k+1", exist repeatedly, the first point of the first combination and the last point of the last combination are to be extracted as vector points, as shown in FIG. 28 by references a and b.

Figure 30:
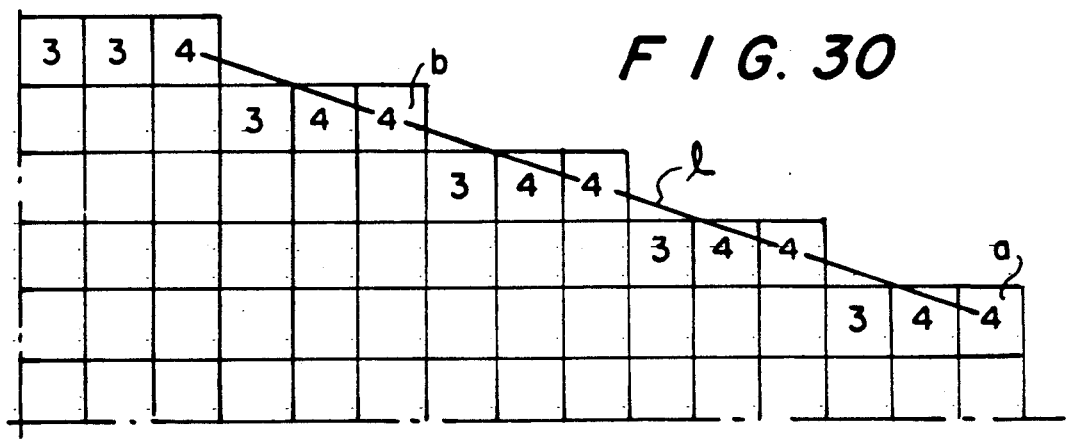

The configuration in FIG. 30 has the inclination opposite to the configuration of FIG. 28. The chain code trains "443" are repeatedly generated. The configuration in FIG. 31 has the inclination opposite to the configuration of FIG. 29. The chain code trains "001" are repeatedly generated. In these configurations, the start point of the first step and the end point of the last step may be extracted as vector points so that the configuration is approximated as a straight line.

The above stepwise configurations have rather gradual inclination.

The configurations in FIGS. 32 to 35 have rather steep inclination.

The configuration in FIG. 32 has repeated chain code trains of "665".

The configuration in FIG. 33 has repeated chain code trains of "667".

Figure 34:
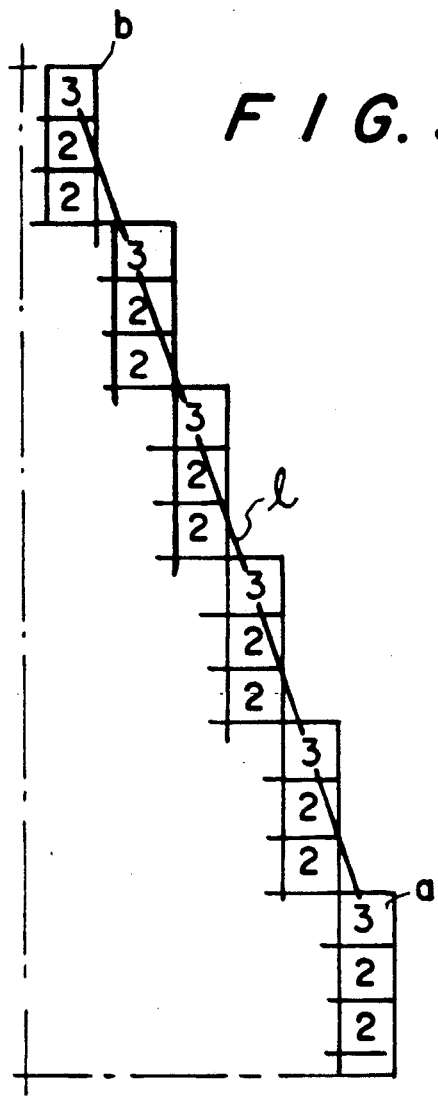

The configuration in FIG. 34 has repeated chain code trains of "223".

Figure 35:
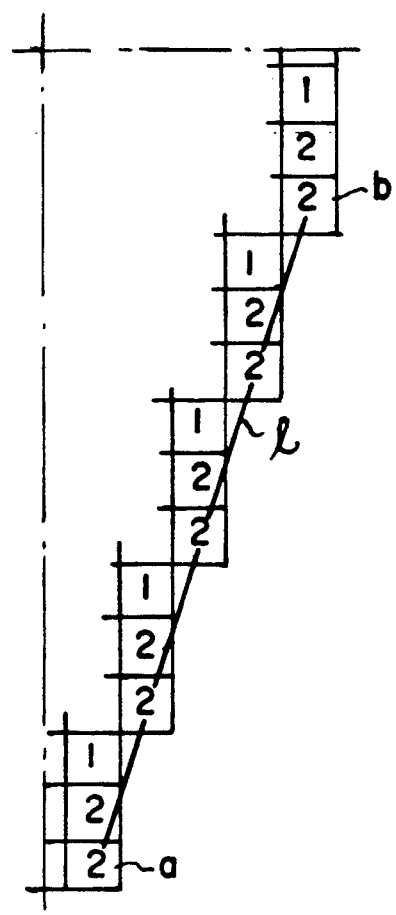

The configuration in FIG. 35 has repeated chain code trains of "221".

In each configuration of steep steps, the lower edge point of each step should be extracted when the boundary faces downwardly, and vice versa, as shown in FIGS. 32 to 35.

The approximation rule for stepwise configuration is summarized as follows;

(vi) In the chain code train consisting of repeated chain code trains of "k, k, ..., k, k−1", the first pixel of "k" in the first chain code train and the first pixel of "k" in the last chain code train are to be extracted as vector points.

(vii) In the chain code train consisting of repeated chain code trains of "k, k, ..., k, k+1", the pixel of "k+1" in the first and last chain code trains are to be extracted as vector points.

The generalized rules are also applicable to vectorizing of a hole. When the chain code train is generated clockwisely, oppositely to the above, the chain code changes in the chain code train should be reversely understood, that is, the increment and decrement are reversed.

When a code equivalent to chain code is applied for vectorizing, the rules above can easily be modified.

As shown in the embodiments above, by extracting vector points according to the chain code or any other equivalent code, vector data can be easily be generated without complex angular calculation. A high quality configuration can be reappeared from the vector data.

Although only a few exemplary embodiments of this invention have been described in detail above, those skilled in the art will readily appreciate that many modifications are possible in the exemplary embodiments without materially departing from the novel teachings and advantages of this invention.

Accordingly, all such modification are intended to be included within the scope of this inventions as defined in the following claims.

What is claimed is:

1. A vectorizing method comprising the steps of:
   (a) generating an original train of codes, the values of said codes specifying boundary pixels of a configuration;
   (b) identifying a pattern of code values in said original train, said pattern indicating a sequence of codes to be modified;
   (c) generating a revised train of codes by modifying code values of said indicated sequence; and
   (d) extracting vector points defining the borders of said configuration from said revised train of codes.

2. A vectorizing method according to claim 1 wherein said codes are Freeman's chain codes.

3. A vectorizing method in anticlockwise direction according to claim 2, wherein the step of extracting vector points includes a step of extracting a pixel corresponding to chain code k2 in a chain code train of "k1, k2, k3" included in said original train of codes when $k2 \neq k1 - 1$.

4. A vectorizing method in anticlockwise direction according to claim 2, wherein the step of extracting vector points includes a step of extracting a pixel corresponding to chain code k3 in a chain code train of "k1, k2, k3" included in said original train of codes when $k2 = k1 - 1$.

5. A vectorizing method in anticlockwise direction according to claim 2, wherein the step of extracting vector points includes a step of extracting a pixel corresponding to chain code k2 in a chain code train of "k1, k1, ..., k1, k2, k3" included in said original train of codes when $k1 \neq k2$, $k2 \neq k3$, $k3 \neq k1$, $k2 \neq k1 - 1$.

6. A vectorizing method in anticlockwise direction according to claim 2, wherein the step of extracting vector points includes a step of extracting a pixel corresponding to chain code k3 in a chain code train of "k1, k1, ..., k1, k2, k3" included in said original train of codes when $k1 \neq k2$, $k2 \neq k3$, $k3 \neq k1$, $k2 = k1 - 1$.

7. A vectorizing method in anticlockwise direction according to claim 2, wherein the step of extracting vector points includes a step of extracting a pixel corresponding to the first chain code k2 in a chain code train of "k1, k2, k2, ..., k2, k3" included in said original train of codes when $k1 \neq k2$, $k2 \neq k3$, $k3 \neq k1$, and $k2 \neq k1 - 1$.

8. A vectorizing method in anticlockwise direction according to claim 2, wherein the step of extracting vector points includes a step of extracting a pixel corresponding to chain code k3 in a chain code train of "k1, k2, k2, ..., k2, k3" included in said original train of codes when $k1 \neq k2$, $k2 \neq k3$, $k3 \neq k1$, and $k2 = k1 - 1$.

9. A vectorizing method in anticlockwise direction according to claim 2, wherein the step of extracting vector points includes a step of extracting a pixel corresponding to the first chain code of k2 in a chain code train "k1, k1, ..., k1, k2, k2, ..., k2, k3" included in said original train of codes when $k1 \neq k2$, $k2 \neq k3$, $k3 \neq k1$.

10. A vectorizing method in anticlockwise direction according to claim 2, wherein the step of extracting vector points includes a step of extracting pixels corresponding to the first chain code K in the first and last occurrence of a repeating chain code combination when a chain code combination of "k, k, ..., k, k−1" is repeatedly generated in said original train of codes.

11. A vectorizing method in anticlockwise direction according to claim 2, wherein the step of extracting vector points includes a step of extracting pixels corresponding to chain code k+1 in the first and last occurrence of a repeating chain code combination when a chain code combination of "k, k, ..., k, k+1" is repeatedly generated in said original train of codes.

12. A vectorizing method in clockwise direction according to claim 2, wherein the step of extracting vector points includes a step of extracting a pixel corresponding to chain code k2 in a chain code train of "k1, k2, k3" included in said original train of codes when $k2 \neq k1 + 1$.

13. A vectorizing method in clockwise direction according to claim 2, wherein the step of extracting vector points includes a step of extracting a pixel corresponding to chain code k3 in a chain code train of "k1, k2, k3" included in said original train of codes when k2≠k1+1.

14. A vectorizing method in clockwise direction according to claim 2, wherein the step of extracting vector points includes a step of extracting a pixel corresponding to chain code k2 in a chain code train of "k1, k1, ..., k1, k2, k3" included in said original train of codes when k1≠k2, k2≠k3, k3≠k1 and k2≠k1+1.

15. A vectorizing method in clockwise direction according to claim 2, wherein the step of extracting vector points includes a step of extracting a pixel corresponding to chain code k3 in a chain code train of "k1, k1, ..., k1, k2, k3" included in said original train of codes when k1≠k2, k2≠k3, k3≠k1 and k2≠k1+1.

16. A vectorizing method in clockwise direction according to claim 2, wherein the step of extracting vector points includes a step of extracting a pixel corresponding to the first chain code k2 in a chain code train of "k1, k2, k2, ..., k2, k3" included in said original train of codes when k1≠k2, k2≠k3, k3≠k1, k2=k1+1.

17. A vectorizing method in clockwise direction according to claim 2, wherein the step of extracting vector points includes a step of extracting a pixel corresponding to chain code k3 in a chain code train of "k1, k2, k2, ..., k2, k3" included in said original train of codes when k1≠k2, k2≠k3, k3≠k1, k2=k1+1.

18. A vectorizing method according to claim 2, wherein the step of extracting vector points includes a step of extracting pixels corresponding to chain code k+1 in the first and last occurrence of a repeating chain code combination when a chain code combination of "k, k, ..., k, k+1" is repeatedly generated in said original train of codes.

19. A vectorizing method in clockwise direction according to claim 2, wherein the step of extracting vector points includes a step of extracting pixels corresponding to chain code k+1 in the first and last occurrence of a repeating chain code combination when a chain code combination of "k, k, ..., k, k−1" is repeatedly generated in said original train of codes.

20. A vectorizing method in anticlockwise direction according to claim 2, wherein the step of generating a revised train of codes includes a step of changing a combination of chain codes "076" included in said original train of codes to "0066".

21. A vectorizing method in anticlockwise direction according to claim 2, wherein the step of generating a revised train of codes includes a step of changing a combination of chain codes "210" included in said original train of codes to "2200".

22. A vectorizing method in anticlockwise direction according to claim 2, wherein the step of generating a revised train of codes includes a step of changing a combination of chain codes "654" included in said original train of codes to "6644".

23. A vectorizing method in anticlockwise direction according to claim 2, wherein the step of generating a revised train of codes includes a step of changing a combination of chain codes "432" included in said original train of codes to "4422".

24. A vectorizing method in clockwise direction according to claim 2, wherein the step of generating a revised train of codes includes a step of changing a combination of chain codes "670" included in said original train of codes to "6600".

25. A vectorizing method in clockwise direction according to claim 2, wherein the step of generating a revised train of codes includes a step of changing a combination of chain codes "012" included in said original train of codes to "0022".

26. A vectorizing method in clockwise direction according to claim 2, wherein the step of generating a revised train of codes includes a step of changing a combination of chain codes "456" included in said original train of codes to "4466".

27. A vectorizing method in clockwise direction according to claim 2, wherein the step of generating a revised train of codes includes a step of changing a combination of chain codes "234" included in said original train of codes to "2244".

28. A vectorizing method according to claim 1, wherein the step of generating an original train of codes includes steps of:
generating an original train of codes for an outer boundary in a first directional rotation around the configuration; and
generating an original train of codes for an inner boundary of the configuration in an opposite rotational direction to that of outer boundary.

29. A vectorizing method according to claim 1, wherein the step of generating an original train of codes includes a step of judging a pixel to determine whether it is the start point of said original train of codes by evaluating its neighbor pixels.

30. A vectorizing method according to claim 29, wherein the step of judging a pixel includes a step of defining a boundary pixel with neither upper nor left neighbors as said start point of said original train of codes on the outer boundary, when a scan line advances rightwardly and is generated after upper scan lines.

31. A vectorizing method according to claim 29, wherein the step of judging a pixel includes a step of defining a boundary pixel with a left neighbor but without a lower neighbor as said start point of said original train of codes on the inner boundary, when a scan line advances rightwardly and is generated after upper scan lines.

32. A vectorizing method according to claim 1, wherein the step of generating an original train of codes includes steps of:
generating codes according to rotational direction around the configuration; and
searching boundary pixels next to a pixel to be given a code in the same rotational direction as the direction of generation of the original train of codes.

33. A vectorizing method according to claim 32, wherein:
the train of codes are Freeman's chain codes;
the pixel to be given a chain code is a direction k from the previous pixel; and
said searching step begins from the direction (k−1) when k is an even number.

34. A vectorizing method according to claim 32, wherein:
the train of codes are Freeman's chain codes;
the pixel to be given a chain code is a direction k from the previous pixel; and
said searching step begins from the direction (k−2) when k is an odd number.

35. A vectorizing method according to claim 1 wherein the step of generating a revised train includes a step of identifying a string of at least one code in the original train to be modified based on codes in the original train on both sides string to be modified.

36. A vectorizing method according to claim 1 wherein the step of generating a revised train of codes includes a step of adding a code corresponding to a pixel not represented in the original code train.

37. A vectorizing method according to claim 36 wherein the step of adding a code includes a step of identifying the location in the original chain where a code is to be added based on codes in the original train of codes on both sides of the location.

38. A vectorizing method according to claim 36 wherein a code in the original train is changed to be compatible with an added code.

39. A vectorizing method according to claim 1 wherein the step of extracting vector points includes a step of defining endpoints of substantially straight segments in the boundary of the configuration.

* * * * *